Aug. 25, 1964    R. B. SCHRECONGOST ETAL    3,145,581
POWER TRANSMISSION MECHANISM
Filed Feb. 10, 1961                      2 Sheets-Sheet 1
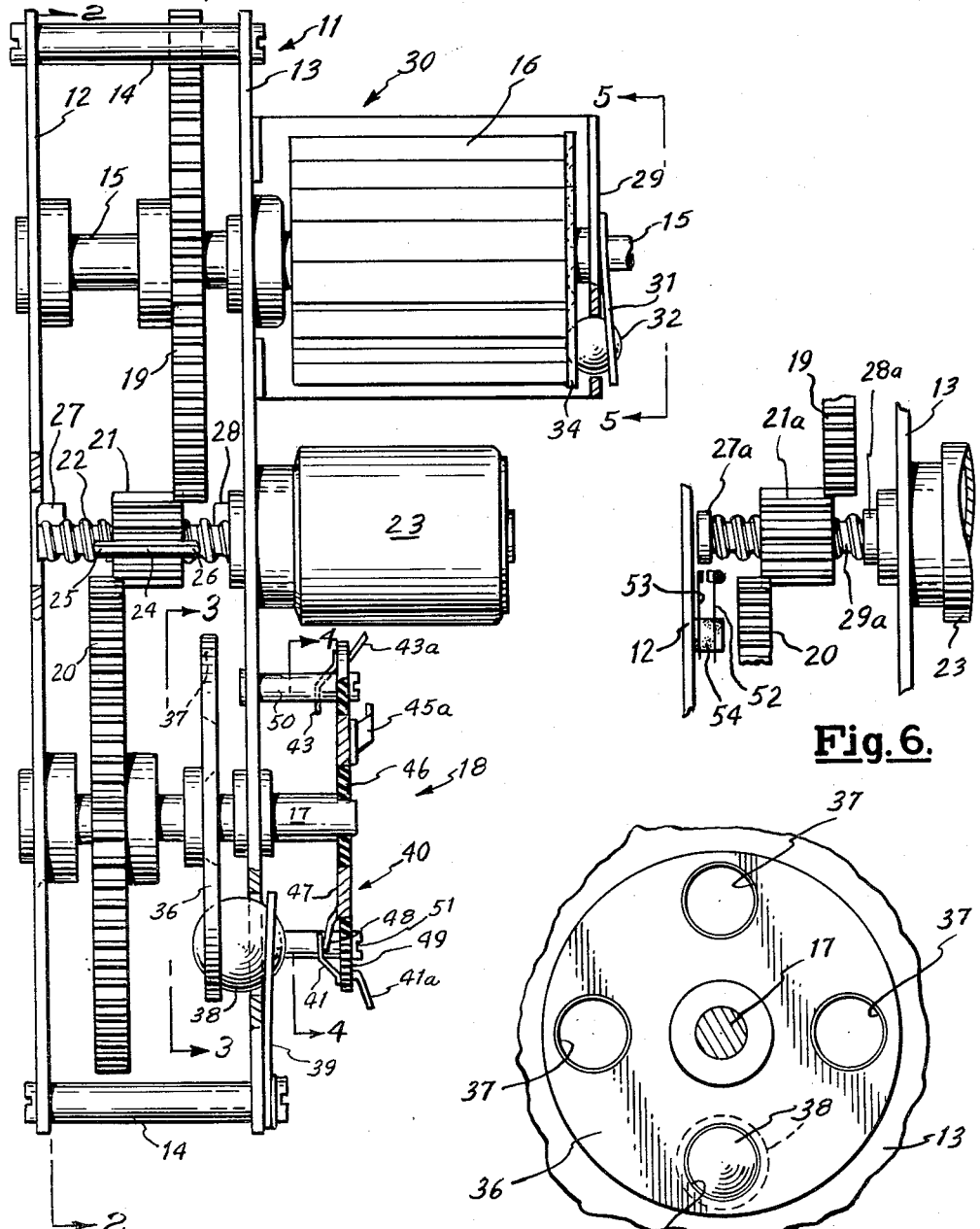
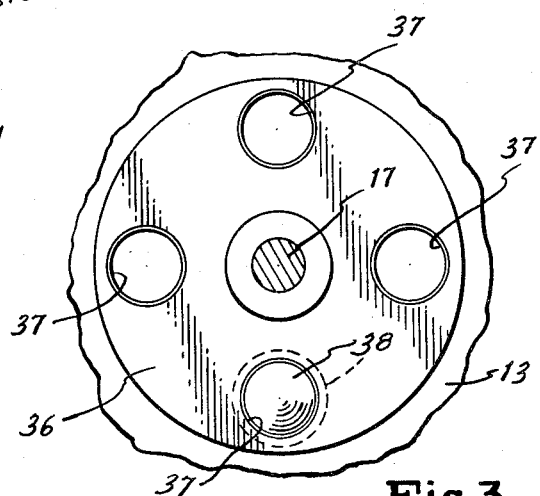
INVENTORS.
*Ray B. Schrecongost*
*Reuben C. Carlson*
BY *James T. Baker*
ATTY.

Aug. 25, 1964   R. B. SCHRECONGOST ETAL   3,145,581
POWER TRANSMISSION MECHANISM
Filed Feb. 10, 1961   2 Sheets-Sheet 2

INVENTORS.
Ray B. Schrecongost
Reuben C. Carlson
BY James T. Barr
ATTY.

United States Patent Office 3,145,581
Patented Aug. 25, 1964

3,145,581
POWER TRANSMISSION MECHANISM
Ray B. Schrecongost, Park Ridge, and Reuben C. Carlson, Bensenville, Ill., assignors to Admiral Corporation, Chicago, Ill., a corporation of Delaware
Filed Feb. 10, 1961, Ser. No. 88,564
8 Claims. (Cl. 74—472)

This invention relates to power transmission mechanism for use with a bidirectional motor, and more specifically to a dual function drive mechanism adapted to alternately drive each of two control linkages in a television receiver or the like.

In the past, motor driven control functions for television receivers have required relatively complex transmission mechanism. Since it is desirable in remotely controlled receivers to be able to drive more than one control linkage from a single motor, some means of selective transmission must be utilized. However, whether unidirectional or bidirectional motors have been used, these transmissions have been relatively complex and expensive.

Therefore, it is an object of this invention to provide a simple, inexpensive power transmission mechanism that will selectively drive either of two separate control linkages.

It is another object of this invention to provide a novel mechanism for rotationally coupling a single driving element to one utilization means upon rotation in a clockwise direction and to another utilization means upon rotation in a counterclockwise direction.

A further object of this invention is to provide a compact, effective, and reliable dual function drive for a television receiver, which comprises a worm gear drive shaft on a bidirectional motor and a follower spur gear axially movable between engagement with each of two control linkages.

More specifically, it is an object of this invention to provide a single motor drive for the volume control and channel selection functions of a remotely controlled television receiver and to provide suitable selective transmission means for severally effecting these functions.

In addition, it is an object of this invention to provide electrical switch means operable with the movement of a follower nut on a spiral-tooth drive shaft to control linkage movements in a television receiver or the like.

Other advantages and objects of the present invention will be apparent from reading the disclosure and claims in this case.

One embodiment of this invention is illustrated by the accompanying drawings in which:

FIGURE 1 is a side elevation of the motor drive, gear assembly, volume control switch assembly, and channel selector assembly of a television receiver.

FIGURE 3 is a partial section taken along 3—3 of FIGURE 1 to show the detent plate associated with the volume control function.

FIGURE 6 illustrates an alternate design of spirally grooved gear and follower nut gear.

Figure 2:
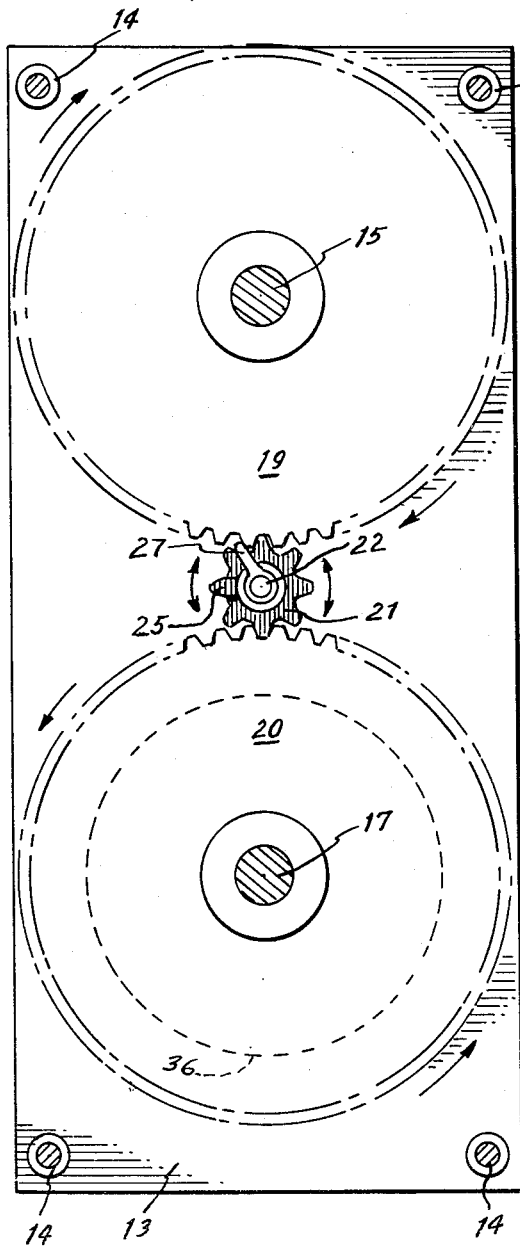
FIGURE 2 is a front view of the gear assembly as viewed from plane 2—2 of FIGURE 1.
Figure 5:
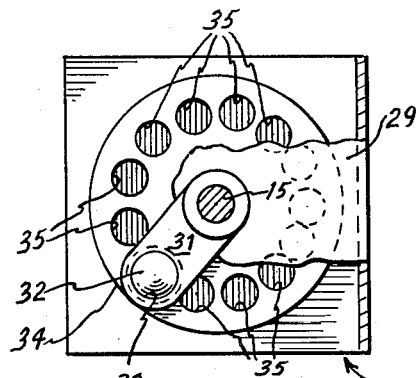
FIGURE 5 is a partial section taken along 5—5 of FIGURE 1 to show the detent arrangement associated with the channel selection function.

Now referring to the drawings, in which like elements are designated by like reference numbers, a mounting frame 11 comprising a pair of rectangular metal plates 12 and 13 parallelly spaced from one another by four corner posts 14 is provided to support the several elements of this embodiment. The frame 11 receives, adjacent one of its ends, a shaft 15 extending from the tuner turret 16, while adjacent its opposite end the frame receives a shaft 17 extending from a volume control switching plate 18. The two shafts 15 and 17 are each provided with a gear, 19 and 20 respectively, through which they may be alternately rotated by a mutually intermeshing gear 21. The gear 21 is spirally grooved in its interior and is mounted to follow a spirally grooved drive shaft 22 extending from a bidirectional motor 23 which is also mounted on frame 11.

As drive shaft 22 is accelerated in a clockwise direction (as viewed in FIGURE 2) the follower gear 21 is urged axially along the shaft 22 by its spiral teeth away from plate 13 and toward plate 12. The follower gear 21 has an elongated tooth 24 that extends past the front surface of gear 21 at 25 and past the rear surface of gear 21 at 26; and the spiral shaft 22 is provided with a radially projecting flange portion 27 adjacent to plate 12 and a similar flange portion 28 adjacent to plate 13. Thus, as gear 21 nears the front end of spiral shaft 22 flange 27 will engage extension 25 and directly drive gear 21 rotationally, preventing further axial movement toward plate 12.

In like manner, as drive shaft 22 is accelerated in a counterclockwise direction (as viewed in FIGURE 2) the follower gear 21 is urged axially away from plate 12 toward plate 13 until flange 28 engages extension 26 and provides direct rotational drive to gear 21.

Gear 19 is positioned parallelly adjacent to plate 13 in driving relation to gear 21 during counterclockwise rotation, while gear 20 is positioned parallelly adjacent to plate 12 in driving relation to gear 21 during clockwise rotation. Gear 21 is slightly thicker than the distance between gears 19 and 20 so that it always meshes with one or the other and never turns freely between them. The rotational loads on gears 19 and 20 provide resistance to rotation of gear 21, while the gear materials are chosen for minimal sliding friction. Therefore, although acceleration of shaft 22 tends to cause both rotational and axial movement of gear 21, there is less resistance to axial movement, so most of the energy imparted to gear 21 by shaft 22 is axial. For this purpose, and to shorten the time required for travel of gear 21 between its driving positions, the less play there is in the gear train, the better is the result.

At this point it should be understood that a more complicated gear train might be interposed between gear 21 and shafts 15 or 17 if greater gear reduction is desired, and that any of a variety of stop means might be employed to replace the extended tooth-radial flange stop arrangement of 25, 26, 27, 28. Any of a wide variety of gear tooth designs might be utilized to facilitate engagement of gear 21 with gears 19 and 20: rounded tooth corners, beveled teeth, etc. If an idler gear were interposed between gear 21 and one of gears 19 or 20 it could be axially spring mounted to allow yieldable contact with gear 21 and thereby facilitate engagement. FIGURE 6 illustrates an alternate gear arrangement wherein a spirally grooved drive shaft 22a carries a follower nut gear 21a between terminal annular stop plates 27a and 28a in and out of engagement with gears 20 and 19. Other and further modifications in design could obviously be made without deviating from the scope of this invention.

Now turning to the particular utilization means associated with the above described transmission in this embodiment, shaft 15, carrying gear 19 and tuner turret 16 is received at its back portion by a flange portion 29 that is disposed parallel to plates 11 and 12. Flange portion 29 is an integral part of a support bracket 30 that is mounted on the back of plate 11 by any suitable means such as welding, bolting, etc.; and it carries a spring leaf 31 that extends radially from shaft 15 in a fixed angular orientation. A ball detent 32 is seated in a hole 33 adjacent the outer end of the spring leaf 31, and is constantly urged into engagement with the back plate 34 of the turret 16. The plate 34 is provided with thirteen holes 35 spaced along a circle concentric with the shaft 15 and opposing the ball 32. As the turret 16 is rotated by the motor 23, the ball 32 rides in and out of the holes 35, seating and unseating itself in each hole as it passes by. When the motor 23 is deenergized the spring leaf 31 acts through the ball 32 to positively position the turret 16 in one of the thirteen positions of seating. Each of these turret positions corresponds to a VHF channel except for one position that switches to UHF tuning.

Figure 4:
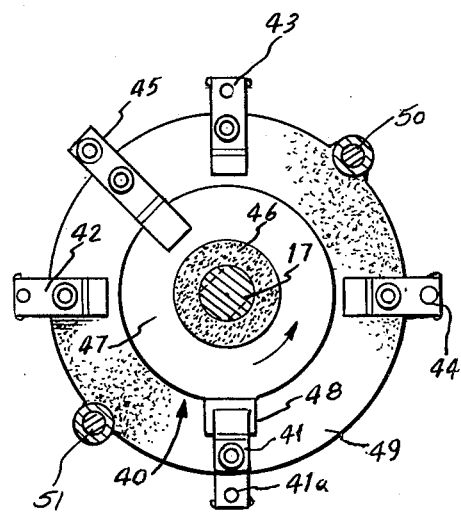
FIGURE 4 is a partial section taken along 4—4 of FIGURE 1 to show the volume control switching plate.

The other shaft 17 carries a similar detent plate 36 provided with four equally spaced holes 37 for cooperation with another ball detent 38 carried by a spring leaf 39 mounted on plate 13 at an adjacent post 14. Corresponding to each of the four ball-seating positions of detent plate 36 are four positions of volume control: three presettable volume levels and an "off" position. The volume control itself is not shown, but a rotary switching disk 40 and five associated terminals 41–45 for supplying the circuit changes that actuate the volume control are shown in FIG. 4. The switching disk 40 comprises an inner portion 46 of insulating material affixed around shaft 17 for rotation therewith and an outer, collector ring portion 47 affixed to inner portion 46. A tab 48 extends radially outward from the disk 40 to sequentially contact terminals 41–44 as the disk 40 is rotated. Terminals 41–45 are mounted on a stationary washer 49 of insulating material that circumscribes disk 40, and each terminal 41–45 extends radially outward from washer 49 to an end portion 41a–45a adapted for fastening a wire thereto. The inner portions of four of the terminals 41–44 are spaced from the collector ring, but positioned for several engagement with the tab 48, one at each of the four ball-seated positions of the shaft 17. The inner portion of terminal 45 rides on the surface of collector ring 47 and is connected therethrough to whichever of terminals 41–44 is engaged by tab 48 at a given time. Washer 49 is mounted in parallel spaced relation to plate 13 on two posts 50 and 51.

In practice, the apparatus disclosed above is designed for use with a remote control system for a television receiver such as that disclosed in the co-pending application of Robert A. Wolff, entitled "Remote Control System," Serial No. 85,029, filed January 26, 1961. The motor 31 is caused to rotate shaft 22 counterclockwise (see FIG. 2) when the channel selector actuating signal is detected and clockwise when a different volume control actuating signal is detected. The spiral gear arrangement of the present invention assures that the correct control linkage is driven. Then, by means of one of the programming and camming switch arrangements which are now well known in the art, the motor 31 is controlled and automatically deenergized when the selected control mechanism reaches a predetermined position. From there, the detent mechanism will positively position the control mechanism for best operation.

It should be noted (see FIG. 6) that switch means may be provided that are operable by the gear nut 21a for controlling an associated function. As gear nut 21a approaches stop 27a due to clockwise rotation of shaft 22a it will bear against switch leaf 52 and force it into contact with switch leaf 53 to close any given external circuitry. Switch leaves 52 and 53 are mounted on plate 12 by stack 54, and similar switch means could be provided at the other end of shaft 22a if desired. Other switch means could obviously replace those shown without deviating from the present invention, and switch means responsive directly to the rotation of the motor 23 are also within the contemplation of this invention.

Numerous other modifications not specifically mentioned herein could also be employed without departing from the spirit and scope of this invention, and it is not intended to limit the scope of the appended claims by the omission from this disclosure of such modifications.

Now, therefore, what is claimed is:

1. In a mechanism for selectively coupling a bidirectional driving member to either of two driven members, a spirally grooved drive shaft selectively rotatable in clockwise and counterclockwise directions, follower nut means mounted on said drive shaft and axially movable therealong between two predetermined positions, said nut means being urged into one of said positions during clockwise rotation and into the other of said positions during counterclockwise rotation, stop means for limiting the axial movement of said nut means between said two predetermined positions, said nut means having means extending therefrom for engagement with said stop means, first utilization means rotationally coupled to said nut means when said nut means is in one of said positions, and second utilization means rotationally coupled to said nut means when said nut means is in the other of said positions.

2. In a mechanism for selectively coupling a bidirectional driving member to either of two driven members, a spirally grooved drive shaft selectively rotatable in clockwise and counterclockwise directions, follower nut means mounted on said drive shaft and axially movable therealong between two predetermined positions, said nut means being urged into one of said positions during clockwise rotation and into the other of said positions during counterclockwise rotation, first utilization means rotationally coupled to said nut means when said nut means is in one of said positions, and second utilization means rotationally coupled to said nut when said nut means is in the other of said positions, said nut means being engaged with at least one of said utilization means throughout its axial movement between said predetermined positions, the axial friction between said rotational means and said nut means being minimal, whereby the resistance to axial movement between said positions will be considerably less than the simultaneous resistance to rotational movement of said nut means.

3. In a mechanism for selectively coupling a bidirectional driving member to either of two driven members, a spirally grooved drive shaft selectively rotatable in clockwise and counterclockwise directions, follower nut means mounted on said drive shaft and axially movable therealong between two predetermined positions, said nut means being urged into one of said positions during clockwise rotation and into the other of said positions during counterclockwise rotation, first utilization means rotationally coupled to said nut means when said nut means is in one of said positions, second utilization means rotationally coupled to said nut means when said nut means is in the other of said positions, said nut means being engaged with at least one of said utilization means throughout its axial movement between said predetermined positions, the axial friction between said rotational means and said nut means being minimal, whereby the resistance to axial movement between said positions will be considerably less than the simultaneous resistance to rotational movement of said nut means, and detent means associated with each of said utilization means to provide each of said utilization means with a plurality of strongly detented positions, the rotational force of said nut means being insufficient to move either of said utilization means from any of its detented positions except when said nut means is in one of said predetermined positions, wherein said nut means is precluded from axial movement in the direction urged by said force.

4. In a television receiver having a remotely controlled channel selector and a remotely controlled volume selector, the combination of a bidirectional motor responsive to a first remotely generated signal to turn in a first direction and drive said channel selector and responsive to a second remotely generated signal to turn in a second direction and drive said volume selector, a drive shaft having a helical gear tooth and being driven by said motor, a spur gear encircling said drive shaft and having a helical groove of complementary configuration with said tooth, first and second stop means defining first and second ends of a portion of said shaft, said spur gear being helically movable relative to said shaft between said first stop means and said second stop means, whereby said spur gear will be urged toward said first end upon rotation of said motor in said first direction and toward said second end upon rotation of said motor in said second direction, a first gear train rotationally coupled to said channel selector, and a second gear train rotationally coupled to said volume selector, said spur gear meshing with an initial gear of said first gear train when adjacent said first end and meshing with an initial gear of said second gear train when adjacent said second end, whereby said motor will drive said channel selector when said motor turns in said first direction and will drive said volume selector when said motor turns in said second direction.

5. In a television receiver having a remotely controlled channel selector and a remotely controlled volume selector, the combination of a bidirectional motor responsive to a first remotely generated signal to turn in a first direction and drive said channel selector and responsive to a second remotely generated signal to turn in a second direction and drive said volume selector, a drive shaft having a helical gear tooth and being driven by said motor, a spur gear encircling said drive shaft and having a helical groove of complementary configuration with said tooth, first and second stop means defining first and second ends of a portion of said shaft, said spur gear being helically movable relative to said shaft between said first stop means and said second stop means, whereby said spur gear will be urged toward said first end upon rotation of said motor in said first direction and toward said second end upon rotation of said motor in said second direction, a first gear rotationally coupled to said channel selector, a second gear rotationally coupled to said volume selector, said spur gear meshing with said first gear when adjacent said first end and meshing with said second gear when adjacent said second end, whereby said motor will drive said channel selector when said motor turns in said first direction and will drive said volume selector when said motor turns in said second direction.

6. In a television receiver having a remotely controlled channel selector and a remotely controlled volume selector, the combination of a bidirectional motor responsive to a first remotely generated signal to turn in a first direction and drive said channel selector and responsive to a second remotely generated signal to turn in a second direction and drive said volume selector, a drive shaft having a helical gear tooth and being driven by said motor, a spur gear encircling said drive shaft and having a helical groove of complementary configuration with said tooth, first and second stop means defining first and second ends of a portion of said shaft, said spur gear being helically movable relative to said shaft between said first stop means and said second stop means, whereby said spur gear will be urged toward said first end upon rotation of said motor in said first direction and toward said second end upon rotation of said motor in said second direction, a first gear rotationally coupled to said channel selector, a second gear rotationally coupled to said volume selector, said spur gear meshing with said first gear when adjacent said first end and meshing with said second gear when adjacent said second end, whereby said motor will drive said channel selector when said motor turns in said first direction and will drive said volume selector when said motor turns in said second direction and switch means for controlling an associated function, said switch means being operably associated with said spur gear whereby a given movement of said spur gear will cause operation of said switch means.

7. In a mechanism for selectively connecting a rotational driving member to either of two rotational driven members, the combination comprising a spirally grooved drive shaft, a driving member mounted thereon and provided with complementary internal spiral grooves, stop means for limiting the axial movement of said driving member between two end positions, a first driven member positioned adjacent one of said end positions, a second driven member positioned adjacent the other of said end positions, each of said driven members being rotationally coupled to said driving member when said driving member is adjacent thereto, said first driven member operating independently of said second driven member to perform a first control function, said second driven member operating independently of said first driven member to perfor a second control function, and bidirectional motor means for selecting which of said control functions shall be performed at a given time, said stop means comprising first and second annular flange portions on said drive shaft, one of said annular flange portions at each of said end positions.

8. In a mechanism for selectively connecting a rotational driving member to either of two rotational driven members, the combination comprising a spirally grooved drive shaft, a driving member mounted thereon and provided with complementary internal spiral grooves, stop means for limiting the axial movement of said driving member between two end positions, a first driven member positioned adjacent one of said end positions, a second driven member positioned adjacent the other of said end positions, each of said driven members being rotationally coupled to said driving member when said driving member is adjacent thereto, said first driven member operating independently of said second driven member to perform a first control function, said second driven member operating independently of said first driven member to perform a second control function, bidirectional motor means for selecting which of said control functions shall be performed at a given time, said stop means comprising first and second driving flanges projecting radially from said drive shaft, one of said flanges at each of said end positions, and first and second stub portions projecting axially from said driving member and being engageable respectively with said first and second driving flanges.

References Cited in the file of this patent
UNITED STATES PATENTS

| | | |
|---|---|---|
| 2,271,207 | Rhein | Jan. 27, 1942 |
| 2,311,168 | Gendriess | Feb. 16, 1943 |
| 2,718,161 | Nelson | Sept. 20, 1955 |
| 3,006,216 | Sisson | Oct. 31, 1961 |